Jan. 17, 1928.　　　　　　　　　　　　　　　　　　1,656,485
H. I. HOHLT
CURRENT MOTOR
Filed Oct. 8, 1926　　　　　2 Sheets-Sheet 1
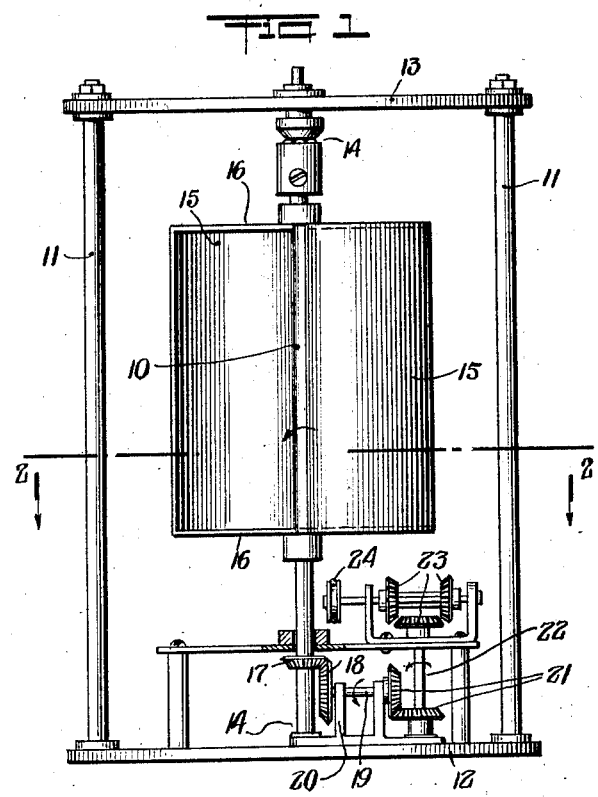
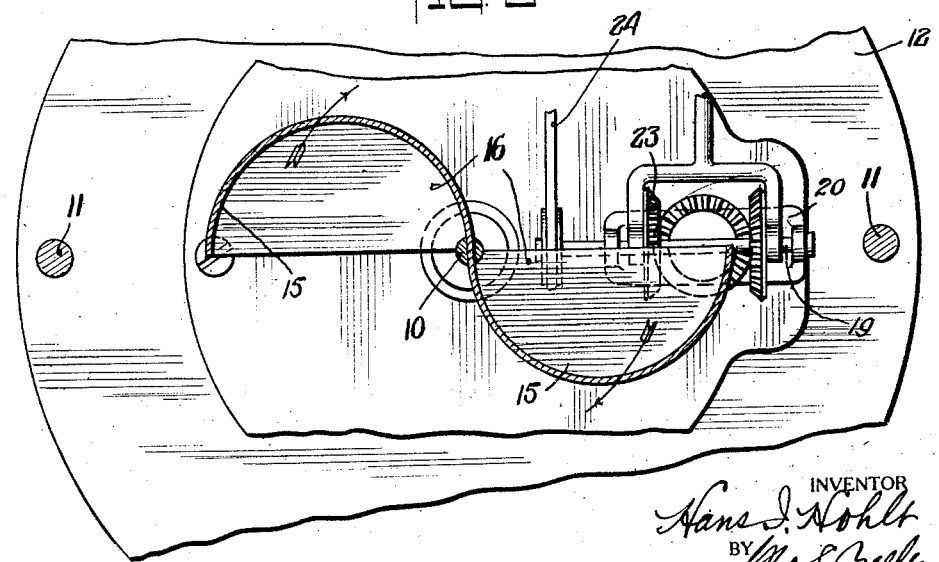
INVENTOR
Hans I. Hohlt
BY
Geo. L. Beeler
ATTORNEY Jan. 17, 1928.
H. I. HOHLT.
CURRENT MOTOR
Filed Oct. 8, 1926   2 Sheets-Sheet 2
1,656,485
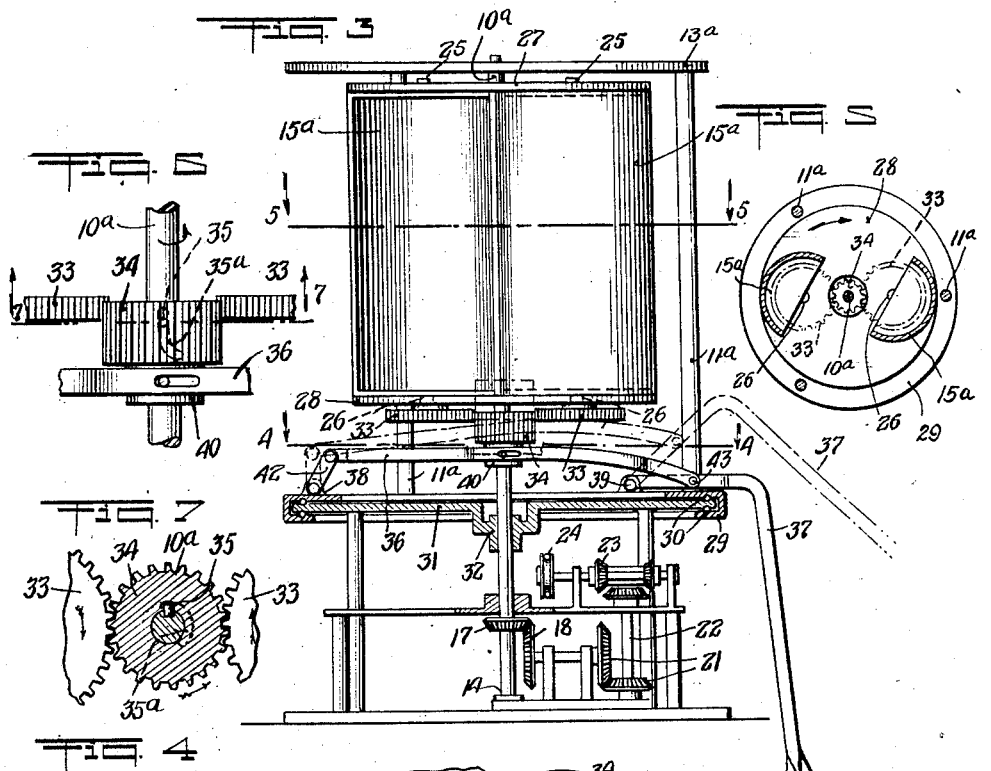
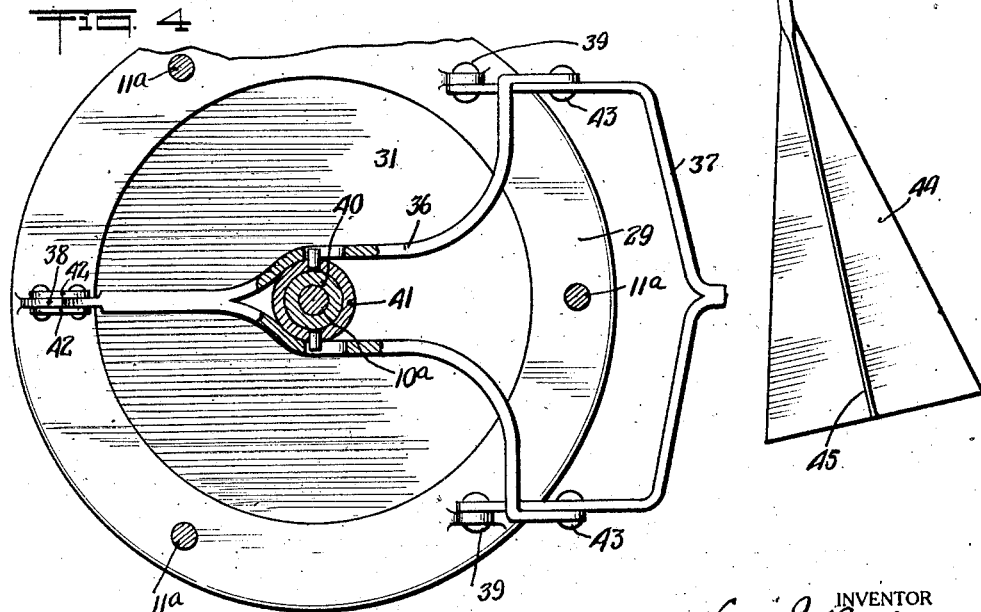
INVENTOR
Hans I. Hohlt
BY
ATTORNEY Patented Jan. 17, 1928.

1,656,485

UNITED STATES PATENT OFFICE.

HANS I. HOHLT, OF SANTO DOMINGO, DOMINICAN REPUBLIC.

CURRENT MOTOR.

Application filed October 8, 1926. Serial No. 140,246.

This invention relates to power or motor mechanisms and has particular reference to means for utilizing the power of the flow of natural currents such as air, water, or other fluids.

Among the objects of the invention is to provide a machine that subject to ordinary or natural wear and tear and the provision of suitable lubrication is calculated for automatic operation when brought within the range of the force of a natural current of air, water, or the like, and whereby said natural current will be availed of for the production of power at a minimum cost.

A further object of the invention is to provide a means whereby the motor may be caused to operate at a substantially uniform rate of speed regardless of variations in velocity or force of the power current.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a front elevation of one form of my improvement.

Fig. 2 is a horizontal section of the same on the line 2—2, but on a larger scale.

Fig. 3 is a view similar to Fig. 1, but indicating a modification of the invention.

Fig. 4 is a horizontal section on the line 4—4 of Fig. 3.

Fig. 5 is a detail section on the plane indicated by the line 5—5 of Fig. 3, but with the wings in changed position.

Fig. 6 is a vertical detail of the wing adjustment mechanism.

Fig. 7 is a transverse section of the same on the line 7—7 of Fig. 6.

Referring now more particularly to the drawings I show my improved motor as comprising a vertical shaft 10 journaled in an upright position in a frame comprising uprights 11, a base 12, and a head piece 13, making a rigid and substantial structure for supporting the operating parts of the mechanism. Any suitable anti-friction bearings as suggested at 14 may be employed for reducing friction between the shaft and its support.

It is contemplated that the shaft 10 will be supported in position to be in the path of a natural current flow such as air, water, or the like, and connected to the shaft are a plurality of power members such as cups, vanes, blades, or the like indicated as hollow half cylinders 15 and as two in number arranged parallel to each other on opposite sides of the shaft and reversely disposed with respect to each other. That is to say, while one of the wings 15 presents its concave surface in one direction, the other at the same instant will present its convex surface in the same direction. The ends of the wings are closed by semi-circular heads 16 to increase the effectiveness of the operating medium. As thus disposed the wings 15 will receive and be influenced as to the rotation of the shaft 10 by the power of the current acting thereupon successively. That is to say, the wind, water, or the other medium, striking at the same time the concave surface of one half cylinder or wing and a convex surface of the other half cylinder or wing will immediately produce a lack of equilibrium in impelling force on both sides of the axis or vertical shaft, because the air current is deflected from the convex surface to both sides, losing thereby in power of impulse, and, secondly, the air current, striking on the other side of the axis or shaft a concave surface, will be concentrated thereon or therein, gaining thereby in power of impulsion. This lack of equilibrium on both sides of the shaft results in instant rotary motion of the shaft, the convex sides of the wings being always in advance, as indicated by the arrows on Fig. 2, subject only to resistance due to friction or the like.

If the current of impelling fluid strikes initially one edge only of one of the wings or half cylinders, which would be true if the wind begins to blow in a direction approximating the plane of both wings, the current will nevertheless produce instant rotation in the same direction as before because the wind will be deflected from its course only to one side, namely, the convex side of the wing first reached thereby and will pass straight along the concave side thereof. This will produce a lack of equilibrium of the force striking the first wing and so move it to the side of deflection, by effective suction, and immediately thereby disposing the concave surface again and producing the effect described above with respect to the action of the wind directed broadside, and, secondly, the same result would take place if the wind came from the opposite side and acted first upon the second wing or half cylinder.

The power generated or created as a result of the rotation of the shaft 10 may be utilized for various purposes such as the operation of other machinery, or power transmitting purposes, or any other required purposes. The means indicated for the transmission of such power includes a pinion 17 fixed to the shaft 10 meshing with a gear 18 on a counter shaft 19 mounted in a bracket 20 supported upon the base 12. A pair of mitre gears 21 are shown to transmit such rotation of the counter shaft 19 to another shaft 22 having communication with reversing mechanism of well known construction at 23 and from which an endless belt 24 is operated for the driving of machinery or other purposes.

In connection with the operation of the mechanism above described it is contemplated that the machine will be under the more or less direct control of an operator whereby in the event of an unusual force of the wind or other current acting upon the rotary members, the operator may do whatever is necessary to prevent the too rapid rotation of the machine with resulting damage thereto. In Fig. 3, however, I show mechanism designed for automatic operation or control irrespective of variations in the speed or force of the propelling currents. In this mechanism the wings $15^a$, while designed for the same general arrangement and purpose as already set forth, are mounted upon independent vertical axes or trunnions 25 and 26 journaled in upper and lower heads 27 and 28 respectively which for the purpose of rigidity are preferably connected rigidly to the main vertical axis $10^a$. The frame for this axis comprising the top piece $13^a$ and a series of preferably three columns $11^a$, is supported upon a turn table 29 having ball bearing connection at 30 with a fixed horizontal platform 31 having a vertical tubular center 32 through which the main shaft $10^a$ projects downward. Power transmitting mechanism of any suitable nature such as that described above may be employed to utilize the power derived from the shaft $10^a$ for practical purposes.

Any suitable means may be provided to move the wings $15^a$ around their respective axes so as to vary the effective current-engaging surfaces thereof. If, for instance, the wings be rotated through 90° so as to bring the concave sides thereof toward the center shaft $10^a$ and each other, the unbalanced effect thereof will be neutralized so that the wind or other current will not cause rotation of the shaft $10^a$. If the extent of individual rotation of the members $15^a$ around their own axes is less than 90°, the effect of neutralization just referred to will be reduced and the angle or extent of such rotation may be determined according to the strength of the current.

I show attached to each of the axes 26 a spur gear 33 between which and meshing with both is a master gear 34 mounted movably upon the shaft $10^a$ but held normally from rotation thereon by a stud 35 in one part and projecting into a specially formed groove $35^a$ in the other. So long therefore as the master gear 34 is held at a predetermined elevation or position of lengthwise adjustment along the shaft $10^a$, said gear has a definite relation to the gears 33 and the other parts of the main rotor, it being borne in mind that the heads 27 and 28 being fixed to the shaft $10^a$ determine the position of the axes of the two wings with respect to the shaft $10^a$. Any suitable means may be provided to shift the master gear up or down and so cause the angular adjustment or rotation thereof and the gears 33 with respect to the rotor. To this end I show actuating means comprising a yoke 36 and a lever 37 having horizontal pivot connections at 38 and 39 respectively with the turn table 29. The yoke 36 embraces a hub extension 40 from the master gear 34 through a collar 41 journaled in a circular channel in the hub 40 and so designed as to allow free rotation of the master gear and shaft $10^a$ within the hub collar 41 at all times. The yoke 36 is connected through a link 42 to the point 38 of attachment with the turn table and its opposite end is pivoted at 43 to the lever 37.

The lever 37 may be regarded as in normal operating position when down close to or toward the turn table as in Fig. 3 in full lines. If the lever, however, be lifted at its outer or free end the yoke 36 will be lifted toward the dotted line position of Fig. 3 with a corresponding elevation of the master gear through the lower head 28 of the rotor. Assuming that this operation of the lever is to be effected automatically by the force of the wind it is provided at its lower end with a vertical fin 44 and horizontal fins 45 for two purposes. The fin 44 will insure that the lever at its free end will project in the direction of the flow of the wind or current from the motor mechanism, while the horizontal fins 45 or those that project laterally from the vertical plane of the fin 44, will be acted upon by the force of the current for the purpose of lifting the lever. The extent of such lifting or elevation of the lever will be in proportion to the force of the wind acting thereupon.

The groove $35^a$ may be variously designed according to the circumstances to be provided for in the installation, but I prefer to form the upper end of it substantially straight and vertical so that the normal favorable operating position of the wings 15ª will not be disturbed until after a sufficiently strong current of air will have lifted the lever to a substantial extent,—say midway between the normal lower position and the maximum elevated position. Otherwise the wings would be moved immediately to a position of less power as soon as the wind commenced to blow or the current began to be operative. When, however, the lever 37 is lifted farther toward the horizontal position the curved portion of the groove 35ª so acts upon the stud 35 as to cause rotation of the master gear on the shaft 10ª and rotation of the wings 15ª simultaneously and to the same extent in the direction tending to bring their concave surfaces toward each other as above set forth. This extent of rotation or adjustment of the wings will therefore be determined directly by and in proportion to the strength of the current acting upon the lever, the design of which and the design of the wings being determined in all cases by the conditions to be encountered and also the size of the active surfaces of the wings. By virtue of the vertical fin 44 and the manner of connecting the actuator mechanism to the turn table, the turn table and actuator mechanism will always be adjusted with the wind, and the rotation of the turn table around the vertical axis of the motor will never in any way interfere with the rotation of the rotor, having no rotational connection between them.

The device is of a relatively simple practical nature from the mechanical standpoint and is dependable for its operation in all normal weather conditions and being devoid of springs or other delicate connecting mechanisms is of a durable practical nature and may be installed and operated with efficiency and moderate expense. I wish to point out also that the details of construction suggested herein as a practical embodiment of the broad features of the invention are susceptible of a wide range of modification without departing from the spirit of the invention hereafter claimed.

I claim:

1. In a current motor, the combination of a circular platform, a turn table mounted for rotation around the periphery thereof, a frame carried by the platform and including a head piece remote from the platform, a power shaft journaled centrally in the platform and in said head piece, a pair of spaced heads fixed to the shaft within the frame, a plurality of wings journaled independently of each other on parallel axes between said heads, each of the wings having a coaxial gear, a master gear mounted upon the main shaft and located between and meshing with the wing gears, means holding the master gear normally from rotation with respect to the shaft upon which it is mounted, the master gear being slidable along the shaft and having means to cause a partial rotation thereof when the sliding movement approaches one limit, thereby causing the wings to rotate through their individual gears, and automatic means co-operating with the master gear to control its sliding movement.

2. In a current motor, a frame, a power shaft journaled therein, means to support the frame permitting it to rotate coaxially of the power shaft, means co-operating with the shaft constituting a rotor within the frame, said rotor comprising a plurality of wings mounted on independent axes parallel to the power shaft, means co-operating with the power shaft and the several wings maintaining them normally in the same relative position, and means carried by the frame first mentioned serving to cause said frame to maintain a certain definite position with respect to the current acting upon the rotor.

3. In a current motor, the combination of a rotor comprising a power shaft and a plurality of wings journaled upon independent axes parallel to the power shaft, means acting between the power shaft and the wings serving normally to hold them in fixed relation to one another for rotation as a unit but permitting relative rotation of the wings under changed conditions of current, a frame surrounding the rotor and in which the power shaft is journaled, means to rotate the frame around the axis of the power shaft and to cause it to assume a definite position with respect to the direction of the current, said last mentioned means including a lever mounted upon the frame, and means acting between said lever and the means controlling the relative positions of the wings and power shaft, serving to actuate the wings around their own axes according to variations in strength of the current.

In testimony whereof I affix my signature.

HANS I. HOHLT.